Hunt, Shippey & Hawse,
Washing Machine,

N° 27,292. Patented Feb. 28, 1860.

Witnesses:
James O'Cleary
L. K. Sutherland

Inventor:
L. D. Hunt  G. R. Shippey
B. B. Hawse
per Geo Patten atty

N. PETERS, PHOTO-LITHOGRAPHER, WASHINGTON, D. C.

UNITED STATES PATENT OFFICE.

L. D. HUNT, G. R. SHIPPEY, AND B. B. HAWSE, OF MORRISVILLE, VERMONT.

WASHING-MACHINE.

Specification of Letters Patent No. 27,292, dated February 28, 1860.

*To all whom it may concern:*

Be it known that we, L. D. HUNT, G. R. SHIPPEY, and B. B. HAWSE, of Morrisville, in the county of Lamoille and State of Vermont, have invented a new and useful Improvement in Washing-Machines; and we do hereby declare that the following is a full, clear, and exact description of the same, reference being had to the annexed drawing, forming part of this specification, in the several figures of which similar characters of reference denote the same part.

Figure 2:
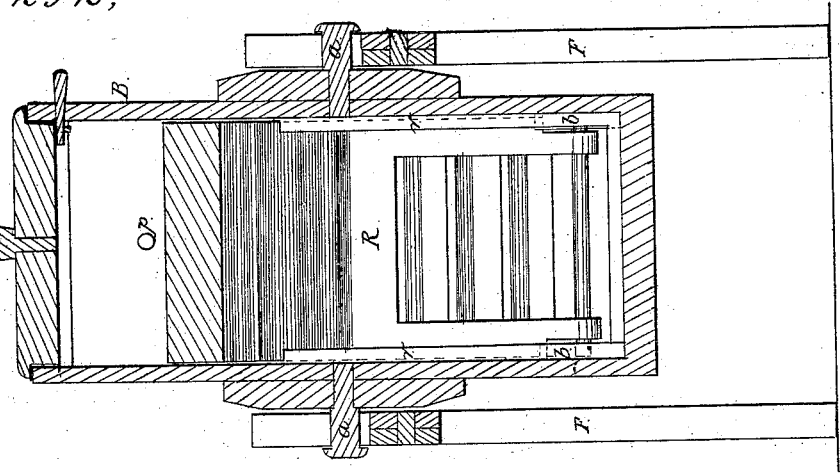
Figure 1:
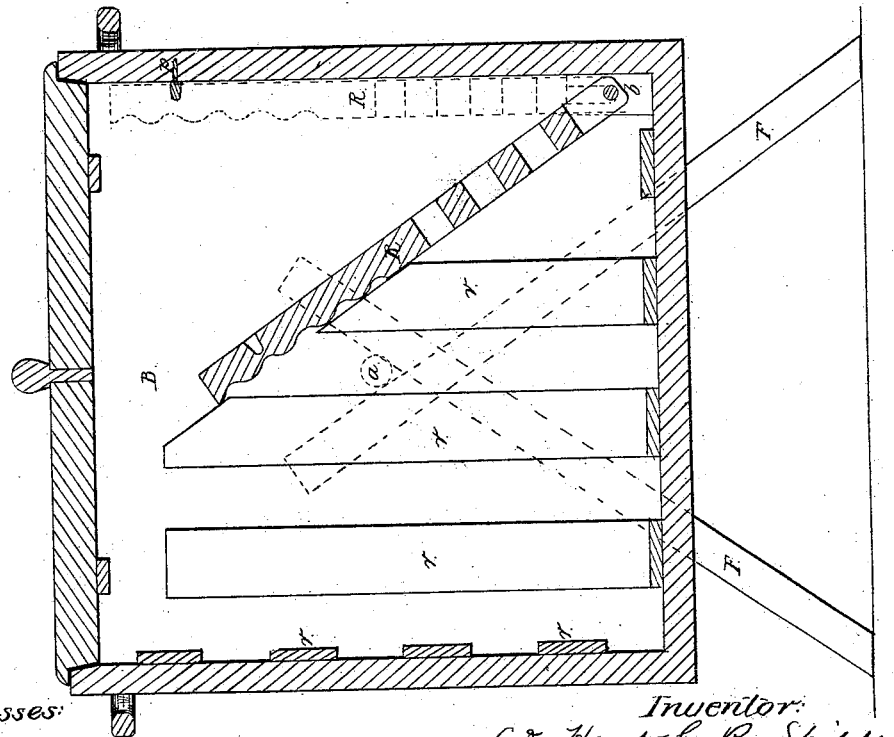

Figure 1 is a vertical longitudinal section through the center of the washing machine. Fig. 2 is a vertical transverse section of the same.

The nature of the invention consists in having a square box with journals on each side resting on the frame so as to allow it to have a partial revolution on these journals. There are ribs on the sides, bottom, and one end of the interior of the box to assist in cleaning the clothes, and at the other end is a rubber hinged at bottom of the box so as to allow it to oscillate with the revolution of the box, the tops of the ribs on either side, near it, being cut away obliquely so as to admit of its movement, and also prevents it from falling on the bottom of the box. This rubber performs the double function of a rubber, and of turning over the clothes, thus assisting very materially in the cleaning. There is a pin near the top of the box which fits into the rubber, and holds it in position when used as a rubber.

In the drawing, B is the box resting on frame F, by journals *a*, *r* the ribs on its sides and bottom, R the oscillating rubber hinged at *b*, and *p* the pin for holding it in position when used as a rubber.

The articles to be washed are placed in the box B, and by its partial revolution on journals *a*, are thrown against the ribs on the sides and bottom of the box, and rubber R, having the oscillating motion as described, at one revolution of the box, is thrown against the end of the box, as shown in red ink in Fig. 1, and the clothes fall upon it, and at the next revolution falls in an inclined position against the ribs as is also shown in Fig. 1, and turns the clothes over, presenting a different surface to the action of the ribs, and thus effectually removing the dirt from them; and should it be required by any stains not removed by this process, the box can be turned down, and stains removed by rubbing them on this rubber R, it thus performing the double function of a rubber and of turning over the clothes.

Having thus described our invention and its operation, we claim—

The oscillating rubber R, performing the double function of a rubber, and of turning over the clothes, in combination with the square box B, having the interior ribs *r*, and operated by its partial revolution on journals *a*, substantially as and for the purposes set forth.

In testimony whereof we have hereunto signed our names before the subscribing witnesses.

LORENZO D. HUNT.
GARDNER R. SHIPPEY.
B. B. HAWSE.

Witnesses:
JOHN MILES,
GEO. A. MILES,
ENOCH BURBANK.